LINEAR MOTOR MOVER WITH HEAT DISSIPATION UNIT

BACKGROUND OF THE INVENTION

1. Field of the Invention

The present invention relates generally to a linear motor mover structure, and more particularly to a linear motor mover with heat dissipation unit.

2. Description of the Related Art

A conventional linear motor is composed of a stator and a mover. The linear motor works in a basic principle that a magnetic field varies between the mover and the stator to linearly drive the mover. The mover can be driven directly by means of the magnetic field without any additional transmission mechanism. Accordingly, the linear motor has the advantages of high precision, low frictional loss, high driving efficiency, low noise and low failure ratio. Therefore, linear motors are widely applied to various industrial machines or equipments. The mover of the linear motor serves to drive the machine or equipment to linearly move at high precision. The linear motor is advantageous over the traditional motor in many respects. However, the mover will generate heat in operation to lower the efficiency of the linear motor.

Most of the linear motors are equipped with heat dissipation units for effectively carrying away the heat and lowering operation temperature of the coils. As for the current techniques, the linear motors are generally equipped with air-cooled units with cooperative radiating fins or cooling fans or water-cooled units for dissipating the heat. Among these measures, the water-cooled units can achieve best heat dissipation effect. FIG. 1 shows a linear motor in which the coils 1 are arranged in a tilted state by a predetermined angle. A water-cooled pipe 2 is passed through the coils 1 to carry away the heat from the coils 1. Since the coils 1 are arranged in the tilted state, the magnetic flux of the coils 1 is lower. Moreover, it is difficult to assemble the coils 1 and manufacture the linear motor. In addition, the water-cooled pipe 2 is not in direct contact with the air so that the heat exchange rate between the water-cooled pipe 2 and the air is poor. As a result, such heat dissipation unit of the linear motor can hardly provide satisfactory heat dissipation effect.

SUMMARY OF THE INVENTION

It is therefore a primary object of the present invention to provide a linear motor mover with heat dissipation unit. The heat dissipation unit is a water-cooled unit having a surface in direct contact with air. Therefore, the heat dissipation efficiency of the linear motor is effectively enhanced.

It is a further object of the present invention to provide the above linear motor mover with heat dissipation unit, in which the coils have higher magnetic flux.

It is still a further object of the present invention to provide the above linear motor mover with heat dissipation unit, which can be easily assembled to shorten working time and lower labor cost.

To achieve the above and other objects, the linear motor mover with heat dissipation unit of the present invention includes: a base seat; a mover having several coils sequentially upright arranged with first ends of the coils disposed in the base seat; a heat dissipation unit having a hollow and substantially slat-shaped cooling section, one face of the cooling section being immediately adjacent to second ends of the coils opposite to the base seat, whereby the heat generated by the coils during operation of the mover can be conducted from the coils to the cooling section, the cooling section containing a cooling fluid therein, the cooling fluid flowing within an interior of the cooling section to carry away the heat absorbed by the cooling section; and an insulation section disposed between the heat dissipation unit and the coils.

The present invention can be best understood through the following description and accompanying drawings, wherein:

DETAILED DESCRIPTION OF THE PREFERRED EMBODIMENTS

Figure 1:
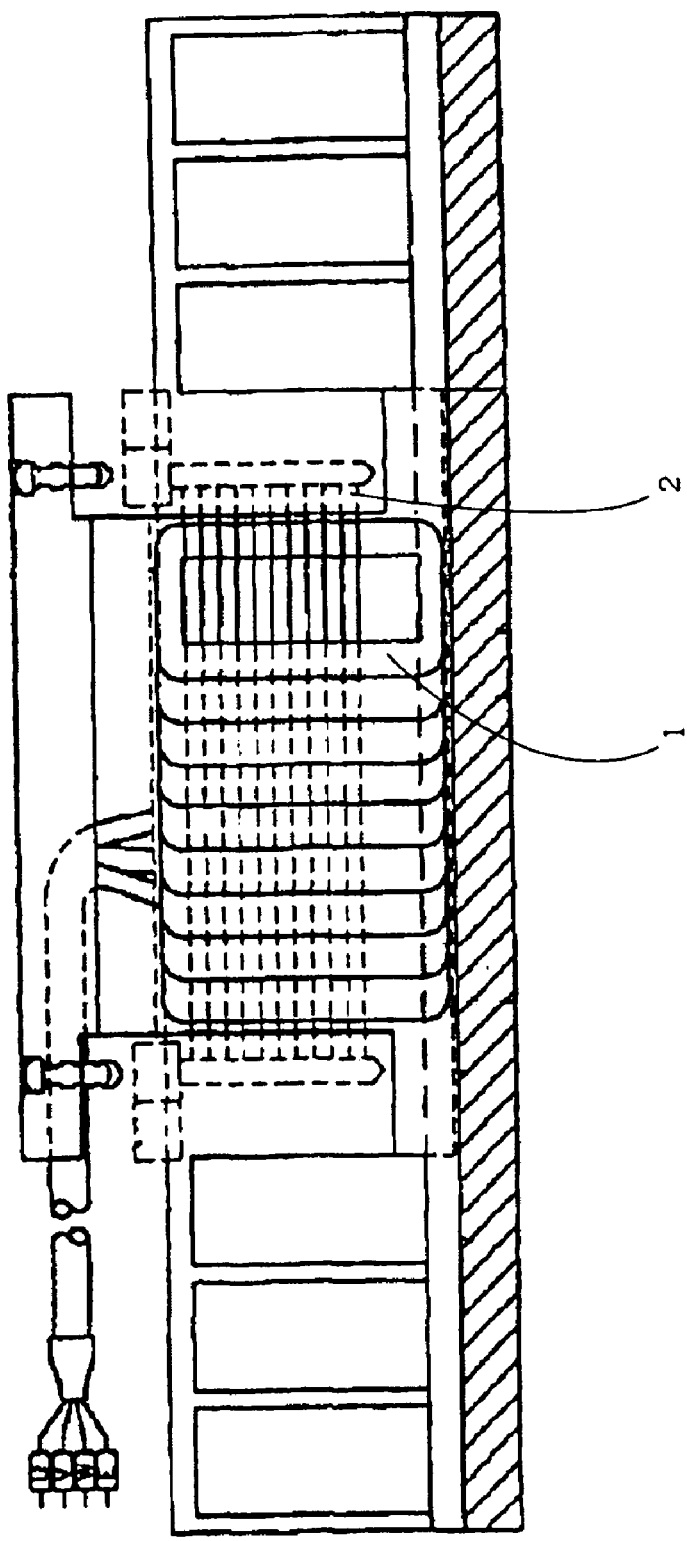
FIG. 1 is a view of a conventional linear motor.
Figure 2:
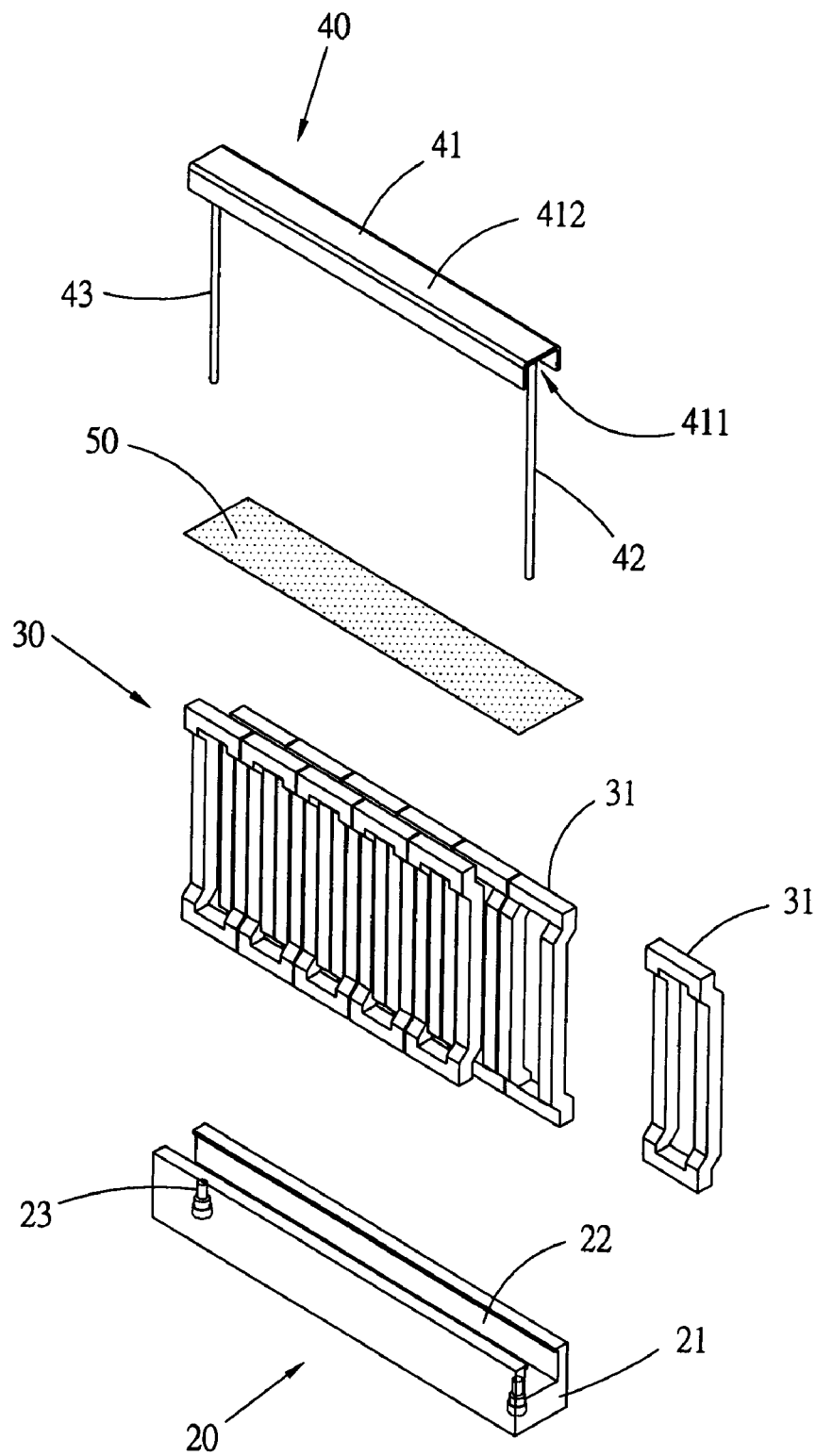
FIG. 2 is a perspective exploded view of a preferred embodiment of the present invention.
Figure 3:
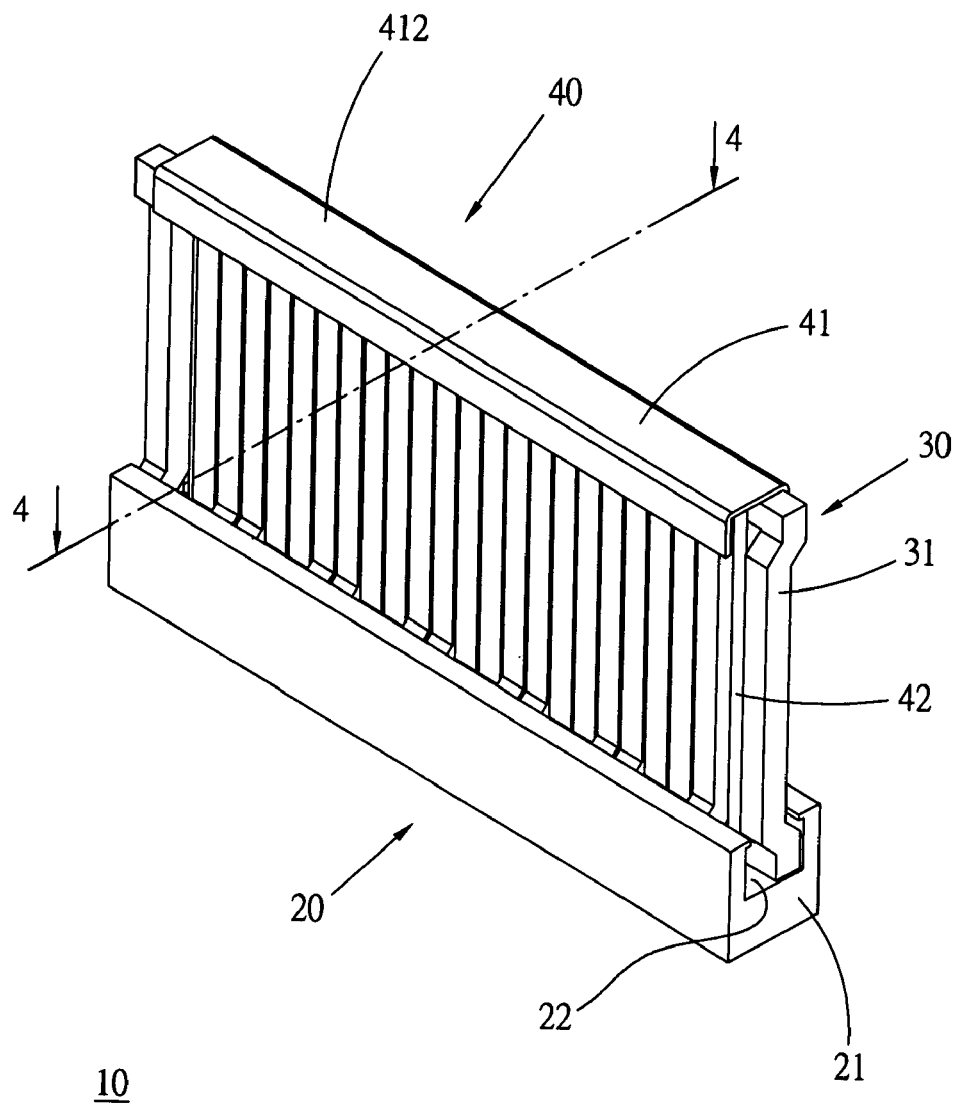
FIG. 3 is a perspective assembled view of the preferred embodiment of the present invention.
Figure 4:
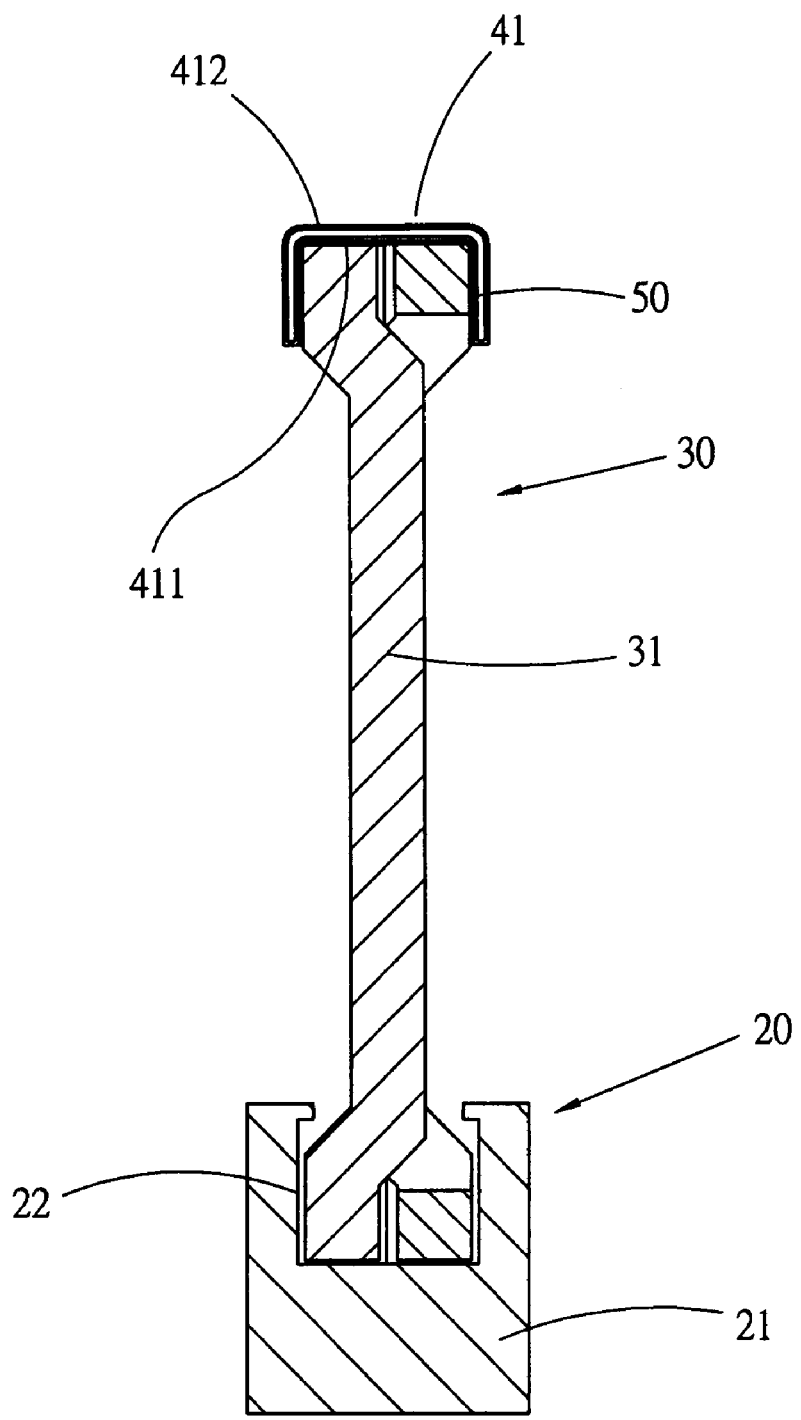
FIG. 4 is a sectional view taken along line 4-4 of FIG. 3.

Please refer to FIGS. 2 to 4. According to a preferred embodiment, the linear motor mover 10 with heat dissipation unit of the present invention mainly includes a base seat 20, a mover 30, a heat dissipation unit 40 and an insulation section 50.

The base seat 20 has an elongated main body 21. The main body 21 has an elongated insertion channel 22 lengthwise formed on the main body 21. Two through holes 23 are respectively formed through two ends of the main body 21.

The mover 30 has several coils 31. The coils 31 are sequentially upright arranged with their bottom ends inlaid in the insertion channel 22.

The heat dissipation unit 40 has a hollow cooling section 41. The cooling section 41 is reverse U-shaped and is capped on top ends of the coils 31 opposite to the base seat 20. Cooling fluid can flow through the cooling section 41 to carry away the heat generated by the coils 31 during operation of the mover 30. The heat dissipation unit 40 further has a water inlet pipe 42 with a predetermined length and a water outlet pipe 43 with a predetermined length. First ends of the water inlet pipe 42 and the water outlet pipe 43 communicate with two ends of the cooling section 41 respectively. Second ends of the water inlet pipe 42 and the water outlet pipe 43 are connected to the through holes 23 respectively.

The cooling section 41 includes a first contact face 411 immediately adjacent to the coils 31 and a second contact face 412 directly in contact with air for enhancing heat exchange between the cooling section 41 and the air.

The insulation section 50 is disposed between the heat dissipation unit 40 and the coils 31.

According to the above arrangement, the cooling section 41 is capped on predetermined sections of the coils 31. The cooling fluid can flow from the water inlet pipe 42 into the cooling section 41 and flow through the cooling section 41 and then flow out from the water outlet pipe 43. Accordingly, the cooling fluid can continuously circulate within the heat dissipation unit 40 to effectively carry away the heat generated by the coils 31 during operation of the mover 30. This can enhance operation efficiency of the linear motor and prolong the lifetime thereof.

The first contact face 411 of the cooling section 41 directly contacts with the respective coils 31 by a large area so that the heat is conducted from the coils 31 to the cooling section 41 at high efficiency. Moreover, the second contact face 412 directly contacts with the air to enhance heat exchange between the cooling section 41 and the air, whereby the heat can be quickly carried away from the coils 31.

In addition, the insulation section 50 is disposed at the junction between the heat dissipation unit 40 and the coils 31 to keep a stable electrical performance.

In the linear motor mover 10 with heat dissipation unit of the present invention, the cooling section 41 is directly capped on the coils 31. In this case, the coils 31 can be directly upright arranged in the base seat 20 without being tilted. In the conventional linear motor, the coils are positioned in a tilted state. In comparison with the conventional linear motor, the coils 31 of the present invention are upright arranged in the base seat 20. As for the coils with the same size, the upright ones have better magnetic flux than the tilted ones. Moreover, the mover with the upright coils can be more easily assembled.

It should be further noted that:

First, the size of the cooling section can be enlarged or minified according to the number of the coils of the mover. Therefore, the use of the cooling section is not limited by the number of the coils of the mover.

Second, the coils can be more securely located in their true positions by means of filling an adhesive around the coils or painting a resin around the coils or in any other manner that can securely locate the coils in their true positions.

Third, in the above embodiment, cooling water is used as a medium for dissipating the heat. However, the medium for dissipating the heat is not limited to the cooling water. Alternatively, any other suitable fluid can be used instead of the cooling water to flow within the interior of the cooling section. This can achieve the same heat dissipation effect.

The above embodiments are only used to illustrate the present invention, not intended to limit the scope thereof. Many modifications of the above embodiments can be made without departing from the spirit of the present invention.

What is claimed is:

1. A linear motor mover with heat dissipation unit, comprising: a base seat; a mover having several coils, the coils being sequentially upright arranged with first ends of the coils disposed in the base seat; a heat dissipation unit having a hollow cooling section, the cooling section being substantially slat-shaped, one face of the cooling section being immediately adjacent to second ends of the coils opposite to the base seat, whereby the heat generated by the coils during operation of the mover can be conducted from the coils to the cooling section, the cooling section containing a cooling fluid therein, which flows within an interior of the cooling section to carry away the heat absorbed by the cooling section; and an insulation section disposed between the heat dissipation unit and the coils, wherein the heat dissipation unit further has a water inlet pipe with a predetermined length and a water outlet pipe with a predetermined length, first ends of the water inlet pipe and the water outlet pipe communicating with two ends of the cooling section respectively, second ends of the water inlet pipe and the water outlet pipe being passed through predetermined sections of the base seat respectively.

2. The linear motor mover with heat dissipation unit as claimed in claim 1, wherein the base seat has a main body, the main body having an insertion channel formed on a predetermined section of the main body, the coils being upright arranged in the insertion channel, two through holes being respectively formed at two ends of the main body to connect with the second ends of the water inlet pipe and the water outlet pipe.

* * * * *